United States Patent [19]
Daryoush et al.

[11] Patent Number: 5,104,266
[45] Date of Patent: Apr. 14, 1992

[54] COMPOSITE ANCHOR

[75] Inventors: Anisi Daryoush, Wyhl; Albert Frischmann, Kenzingen; Manfred Rinklake, Emmendingen, all of Fed. Rep. of Germany

[73] Assignee: Upat GmbH & Co., Emmendingen, Fed. Rep. of Germany

[21] Appl. No.: 673,022

[22] Filed: Mar. 21, 1991

[30] Foreign Application Priority Data

Mar. 29, 1990 [DE] Fed. Rep. of Germany ....... 4010051

[51] Int. Cl.⁵ ........................ E21D 20/02; F16B 39/00
[52] U.S. Cl. ............................. 405/259.5; 405/259.6; 411/82
[58] Field of Search ............... 405/259, 260, 261, 262; 411/82; 52/698, 743, 744

[56] References Cited

U.S. PATENT DOCUMENTS

| | | | |
|---|---|---|---|
| 4,773,794 | 9/1988 | Harke | 405/260 |
| 4,787,186 | 11/1988 | Irmscher et al. | 405/260 X |
| 4,836,729 | 6/1989 | Bisping et al. | 411/82 |
| 4,968,185 | 11/1990 | Leibhard et al. | 405/260 |

FOREIGN PATENT DOCUMENTS

| | | |
|---|---|---|
| 2625492 | 12/1977 | Fed. Rep. of Germany . |
| 3146649 | 6/1983 | Fed. Rep. of Germany ...... 405/260 |
| 3238751A1 | 4/1984 | Fed. Rep. of Germany . |

*Primary Examiner*—David H. Corbin
*Attorney, Agent, or Firm*—Baker & Daniels

[57] ABSTRACT

A composite anchor for insertion in a borehole in a soil consists of an anchoring rod with several expanding cones and is surrounded, in its insertion section, by a screen sleeve of a wire mesh, which screen sleeve effects a borehole cleaning and mixing of the mortar compound as the composite anchor is driven in.

20 Claims, 5 Drawing Sheets

COMPOSITE ANCHOR

BACKGROUND OF THE INVENTION

The invention concerns a composite anchor with an anchoring part which under rotation can be inserted in a borehole that can be filled with a curable mortar substance, on the shell surface of which anchoring part a cover is arranged which sweeps across the borehole wall as the composite anchor is inserted in the borehole, and which features a plurality of radial openings Described in the German patent disclosure 26 25 492, a composite anchor of this type features a cover in the form of a gauze type sleeve, which cover serves as a carrier for a hardener serving to cure the mortar compound The gauze type sleeve consists of steel, plastic or glass fiber. As the composite anchor is inserted, synthetic resin distributed on the borehole wall makes contact with the hardener of the sleeve, and the rotary movement of the anchoring part causes a mixing of the hardener and synthetic resin, thereby initiating a curing and achieving after curing of the synthetic resin an adhesion of continuous type.

A composite anchor known from the German patent document 32 38 751 A1 features on the front end of its anchoring part a cone-shaped disk which is connected in rotationally fixed fashion and points with its opening to the rear end of the composite anchor, the rim of which disk sweeps on account of the form and/or material elasticity of the disk across the borehole wall as the composite anchor is inserted in the borehole filled with mortar compound, thereby destroying microcapsules contained in the mortar compound, by pressing them against the borehole wall.

SUMMARY OF THE INVENTION

Basing on this prior art, the invention has as its underlying problem providing a composite anchor of the initially stated type which is characterized by a good connection of the cured mortar compound with the borehole wall and by especially high extraction values.

This problem is inventionally solved in that the cover is connected with the anchoring part in rotationally fixed fashion and extends at least across a peripheral section, in axial direction, along the anchoring part.

In the simplest case, the cover of the anchoring part of the composite anchor may consist of a wire mesh strip which surrounds the shell on one side or, preferably, on opposite sides in fluted fashion. Widening the wire mesh strip in the circumferential direction results in a sleeve type cover across an angle up to 360 degrees. The cover with a plurality of openings may be formed, instead of wire mesh, also through other metal parts provided with holes, specifically perforated sheet steel strips or perforated sheet steel sleeves. With the cover extending in axial direction across a relatively large length, a cleaning of the borehole is simultaneously brought about at many points as the composite anchor is screwed in. The material to be removed from the borehole wall can be removed through the openings of the cover, into the annular space between the surface of the composite anchor provided with cones or a threading and the inside of the sleeve.

The fastener surrounded by the perforated cover of the composite anchor may be fashioned as a threaded rod or as an anchor rod with one or several cones in the fastening section.

In a suitable embodiment the cover is fashioned as a screen sleeve and connected with the threading points of a threaded rod by welding points. Alternatively or additionally, the screen sleeve may feature a driver strip which engages a radial groove that is provided in the composite anchor and extends axially.

Serving specifically as a cleaning element, the cover in the form of a fluted strip or sleeve may specifically be designed as a wire mesh sleeve with a plurality of axial wires and a plurality of wires extending in circumferential direction. In a preferred embodiment of the invention, a wire mesh sleeve is used which on its front end and on the rear end is welded at two diametrically opposed points to an anchoring part featuring several cones. In welding, five wires extending in circumferential direction, but only two wires extending in axial direction are captured within the welding surface. Obtained thereby, between the wire mesh sleeve and the shell surface of the anchoring part is a load-bearing capacity which in the circumferential direction is higher than in axial direction. The result of this is, after the mortar shell has cured, that in the case of a crack through the mortar shell an added expansion of the mortar shell becomes possible through axial traction exerted on the composite anchor, whereby the weld that captures only two axial wires will rupture as a rated break point. To increase the effectiveness of the rated break point, a form fit may be provided for in addition to the welding of the wire mesh sleeve, which formfit is effective in circumferential direction. Especially suited for that purpose is a design of the front end of the anchoring part as a roofed cutting edge which in addition to the possibility of absorbing torsional forces offers the advantage of promoting a good mixing of the mortar in the borehole.

Instead of wire mesh sleeves with axial wires and such extending in circumferential direction, also wire means sleeves may be used whose mutually perpendicular wires extend slanted to the longitudinal axis of the wire mesh sleeve.

Another option consists in constructing the cover of ribbed honeycomb steel sheet.

The cover may also feature a surface in the shape of grater type sheet steel and may be provided with a plurality of radially protruding sheet steel points which are arranged around the openings in a perforated steel sheet. It is also possible to construct the cover of perforated steel sheet with a plurality of holes and a smooth surface.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings wherein.

Corresponding reference characters indicate corresponding parts throughout the several views of the drawings.

The exemplifications set out herein illustrate preferred embodiments of the invention, in one form thereof, and such exemplifications are not to be construed as limiting the scope of the disclosure or the scope of the invention in any manner.

DESCRIPTION OF THE PREFERRED EMBODIMENT

Figure 1:
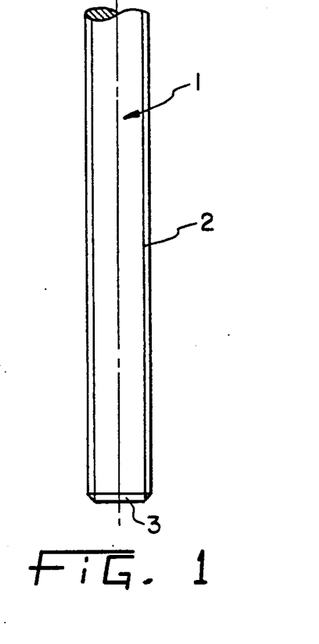
FIG. 1 shows the front end of a threaded rod in side elevation.

FIG. 1 shows a composite anchor fashioned as a threaded rod 1 and serving the fastening of an object not illustrated in the drawing. The threading 2 of the threaded rod 1 extends from the rear end, not illustrated in the drawing, up to the front end 3 of the threaded rod 1 in the manner illustrated in FIG. 1.

Figure 2:
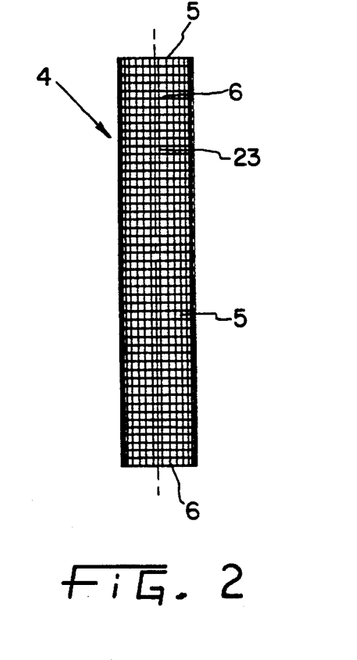
FIG. 2 shows a screen sleeve constructed of wire mesh, in side elevation.
Figure 3:
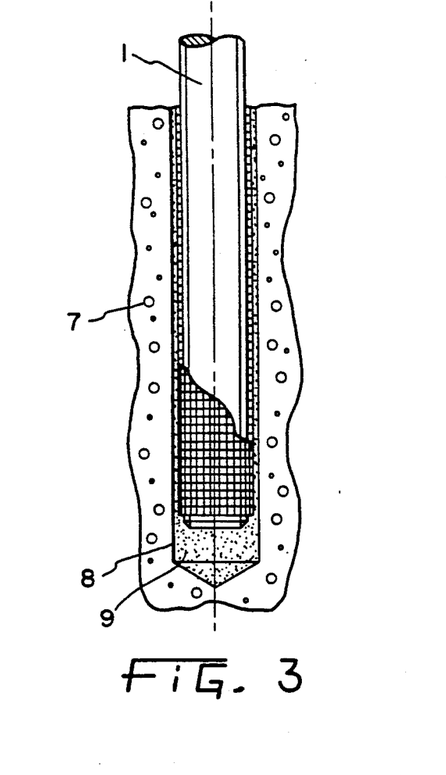
FIG. 3 shows the front end of the threaded rod with the wire mesh sleeve fastened on it in rotationally fixed fashion, after insertion in a borehole filled with mortar compound, in side elevation and partly sectionally.

Coordinated with the threaded rod 1, as cover, is a screen sleeve 4, which in the embodiment illustrated in FIG. 2 is fashioned as a wire mesh sleeve. A screen sleeve 4 of that type consists of round axial wires 5 in a cruciform arrangement to one another and wires 6 extending in circumferential direction. The wires 5, 6 have preferably a wavy shape so as to create between the wires 5, 6 approximately rectangular openings 23. Prior to fastening the threaded rod 1 in the soil, which is illustrated in FIG. 3, a cylindrical borehole 8 is drilled in the soil 7 and partially filled with a mortar compound 9.

Figure 4:
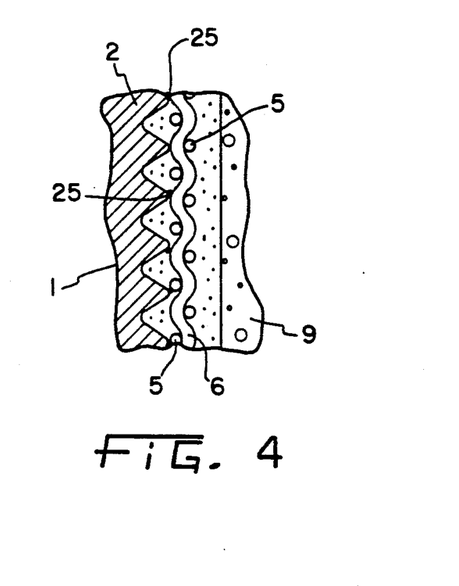
FIG. 4 shows a radial section of the threaded rod in the area of the welding points for connection of the wire mesh with the threading points, as a section.

Before the threaded rod 1 is rotationally driven into the borehole 8 partially filled with mortar compound 9, the screen sleeve 4 is immovably and nonrotatably connected on the shell of the threaded rod 8 in relation to the threading 2, by welding of the wires 5, 6 at the welding points 25, to the threading 2 in the fashion schematically illustrated in FIG. 4. In driving the threaded rod 1 covered with the screen sleeve 4 into the borehole 8 filled with mortar compound 9, the cover formed by the screen sleeve 4 with the openings 23 serve in the rotary setting process as a cleaning sleeve causing a very effective borehole cleaning. The meshes of the screen sleeve 4 consisting of the wires 5, 6 drag along the wall of the borehole 8 in the rotary setting process, causing a specific cleaning of the entire length of the borehole 8. Additionally, the screen sleeve 4 causes a very intensive mixing of the mortar compound 9, since the screen sleeve 4 with its wire mesh shell acts the same as a mixing beater.

Following the curing of the mortar compound in the borehole 8, a very good fastening of the threaded rod 1 in the soil 7 is obtained, since the wires 5, 6 or the screen sleeve cause a reinforcement of the cured mortar compound 9 in arming fashion. Pull-out tests have demonstrated that a conic breakout, when using the screen sleeve 4, extends deeper into the soil 7, with the point of the conic breakout occurring only at the end of the threaded rod 1, and not already in the center of the incorporating depth. Thus, the screen sleeve 4 effects not only a borehole cleaning and thorough mixing of the mortar compound 9 but also an enhancement of the load-bearing capacity of the threaded rod 1 set into the soil 7.

The ratio of the diameter of the threaded rod 1 to the diameter of the borehole 8 corresponds to the usual ratios used in mortar systems for compound anchors but diminishes the annular gap volume, through insertion of the screen sleeve 4 in the annular gap between the shell of the threaded rod 1, and the inside of the borehole 8. The threading 2 of the rod 1 forms the inside of a plurality of annular spaces which outwardly are defined by the screen sleeve 4, as can be seen from FIG. 4.

Instead of the rotationally fixed connection between the screen sleeve 4 and the threaded rod as schematically illustrated in FIG. 4, by welding, other methods may also be used for connecting these parts. Specifically, the screen sleeve 4 used for covering the anchoring part of the threaded rod 1 may be provided with a strip which protrudes inwardly along the inside of its shell while extending axially and resting in an axial groove that extends along the shell of the threaded rod 1 and, thus, can be slipped on the threaded rod 1 in the axial direction.

Figure 5:
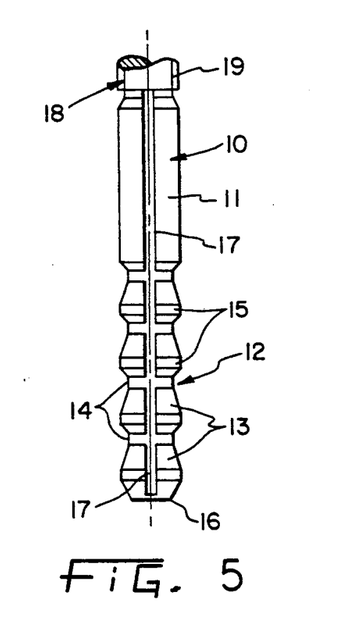
FIG. 5 shows an anchor rod with a cone section featuring several cones, in side elevation.

FIG. 5 illustrates a compound anchor in the form of an anchor rod 10 with a smooth fastening section 11 and a conic section 12 comprised of several expanding cones 13. Located between the expanding cones 13 are annular spaces, always between an inner coating zone 14 in the area of the smallest diameters and an outer cover zone 15 in the area of the largest diameters. Additionally, FIG. 5 depicts a groove 17 extending axially from the front end 16 along the shell of the conic section 12 and the smooth fastening section. The groove 17 extends in the axial direction up to a threaded section 18 with a threading 19 and in the radial direction up to the inner cover zones 14.

Figure 6:
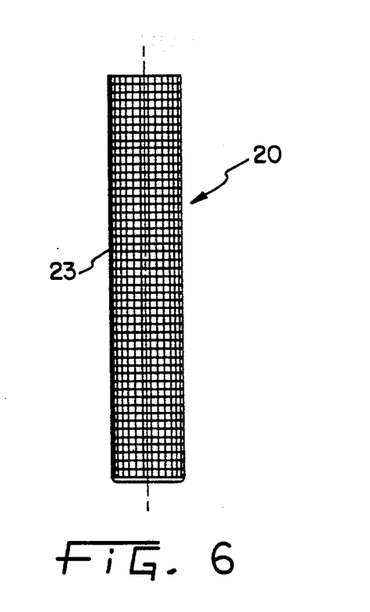
FIG. 6 shows a screen sleeve from wire mesh for axial slipon on the anchor rod according to FIG. 5.
Figure 7:
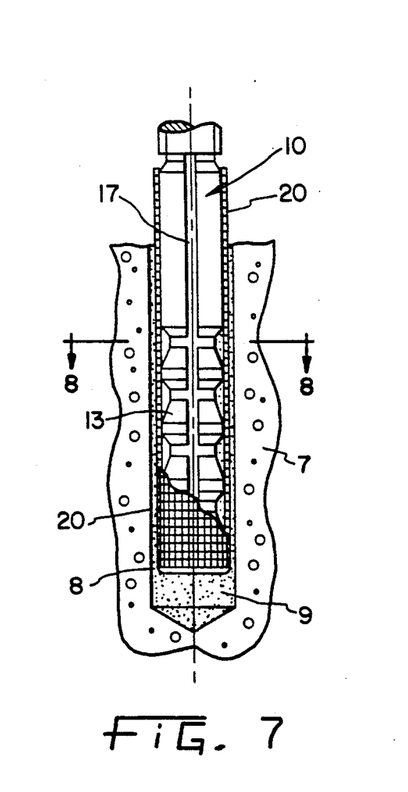
FIG. 7 shows the anchor rod connected in rotationally fixed fashion with the screen sleeve according to FIG. 6 in a borehole filled with mortar compound, in side elevation.

Prior to insertion of the anchoring rod 10 in the borehole 8 illustrated in FIG. 7 in the soil 7, the screen sleeve 20 illustrated in side elevation in FIG. 6 is axially slipped on the anchoring rod 10 so as to cover the fastening section and the conic section 12.

Figure 8:
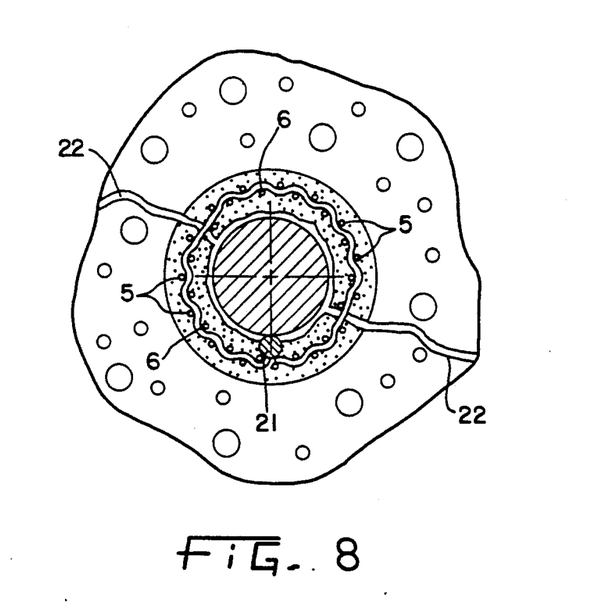
FIG. 8 shows a section along line VIII—VIII in FIG. 7.

A driver strip 21 shown in FIG. 8 extends along the inside shell of the screen sleeve 20 and consists, e.g., of a sufficiently stable wire which is fixedly connected with the screen sleeve 20. In the slipped-on condition of the screen sleeve 20, the driver strip 21 rests in the groove 17, permitting a rotationally fixed connection of the screen sleeve 20 with the anchoring rod 10. In doing so, the groove 17 forms an abutment for the driver strip 21. In the manner illustrated in FIG. 8, the driver strip 21 may consist of an additional part or also of a sufficiently stable and inwardly protruding deformation of the screen sleeve 20.

The screen sleeve 20 is thus fixed in circumferential direction with the aid of the driver strip 21 and the groove 17, whereas in the axial direction it is freely movable up to the stop on the threaded section 18.

On the anchoring rod 10 illustrated in FIG. 5, the screen sleeve 20 is arranged rotationally fixed for covering and cleaning and has in addition to the aforementioned functions two additional functions. The first of these functions is a protective function, since the wires 5, 6 of the wire mesh of the screen sleeve 20 form a protective shell for the surface of the cones 13 of the anchoring rod 10. The cone surfaces of the cones 13, in the case of the anchoring rod 10 illustrated in FIG. 5, are designed as nonadhering, low-friction circumferential surfaces, which in the assembly are protected from damage by the screen sleeve 20.

The second additional function of the screen sleeve 20 exhibits itself as the anchoring rod 10 is anchored in a soil 7, with mortar compound, in the manner illustrated in FIG. 7, in that a crack 22 forms upon curing of the mortar compound 9 as illustrated in FIG. 8. The axial wires 5 of the screen sleeve 20 form tie webs in the cured mortar compound 9 which make it possible to expand the cured mortar shell with a relatively small force, allowing in this way a good after-expansion of the cured mortar shell as the cones 13 perform a relative axial motion. As a result, a deformation of the wires 6 of the meshes formed by wires 5, 6 occurs in the gap formed by the crack 22, in that the wavy shape of the wires 6 is slightly stretched in the area of the crack 22 as the cured mortar shell is widened.

When using mortar compounds 9 that are not premixed, as for instance in compound anchor cartridges, two-component mortars or mortar compounds with encapsulated hardener, the wire shell of the screen sleeves 4 and 20 acts as an especially effective mixing element. Besides, the wire shell with the wires 5, 6 effects a good destruction of the individual capsules of the mortar compound 9 containing one or several encapsulated components and an especially good activation of such mortar compounds 9 as well.

A thorough mixing as required for the chemical reactions is accomplished with all known mortar systems, such as polyester mortar, vinyl ester mortar, epoxy resin mortar and also hydraulic mortars, irrespective of whether the compounds are introduced in the borehole 8 as a glass cartridge or as cartouche mortar.

Figure 9:
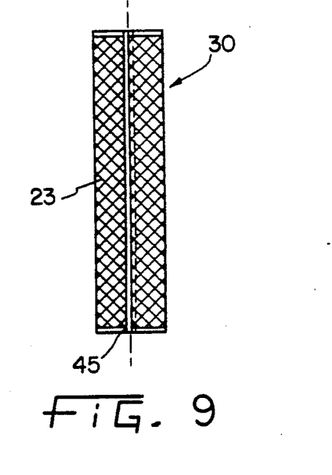
FIG. 9 shows a screen sleeve from ribbed honeycomb metal, in side elevation.
Figure 10:
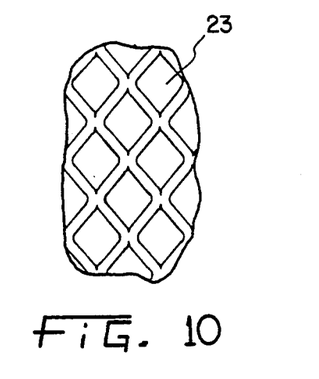
FIG. 10 shows a section of the surface of the screen sleeve according to FIG. 9, scaled up.

Instead of the screen sleeve 4, 20 described above, from wire mesh, it is also possible to use a threaded rod 1 or an anchoring rod 10 with a screen sleeve 30 from ribbed honeycomb metal. FIG. 9 shows a screen sleeve 30 of that type in side elevation. FIG. 10 shows an enlarged view of the structure of the honeycomb metal with approximately quadratic openings 23.

Figure 11:
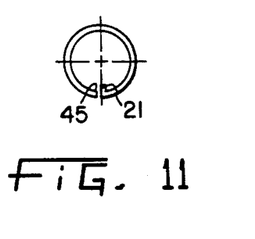
FIG. 11 shows a radial section through the screen sleeve according to FIG. 9.

The driver strip 21 of the screen sleeve 30 as formed by bending over is illustrated in FIG. 11, which shows a cross section of the screen sleeve 30. The driver strip 21 serves the rotationally fixed connection of the screen sleeve 30 with the threaded rod 1 or the anchoring rod 10.

Figure 12:
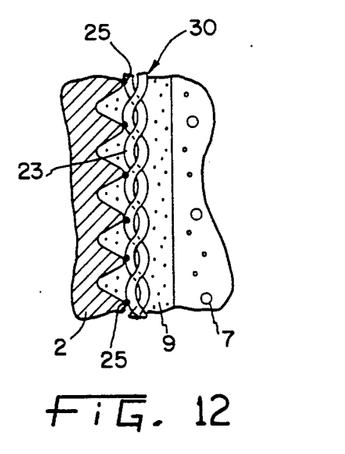
FIG. 12 shows an axial section illustrating the welding points between the screen sleeve according to FIG. 9 and the points of a threaded rod.

FIG. 12 shows additionally or alternatively provided welding points 25 for fastening the honeycomb metal of the screen sleeve 30 on the threading points of the threading 2 of the threaded rod 1.

Figure 13:
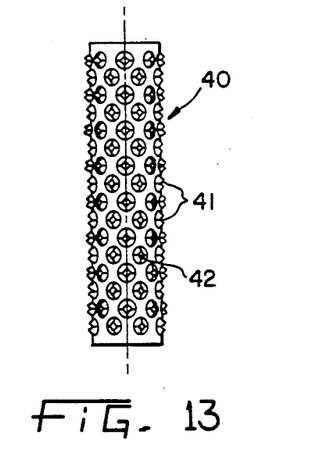
FIG. 13 shows a screen sleeve with a grater type surface.
Figure 14:
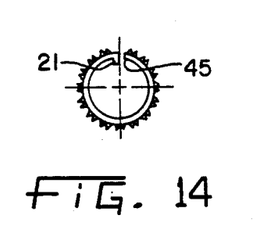
FIG. 14 shows a radial section through the screen sleeve according to FIG. 13.
Figure 15:
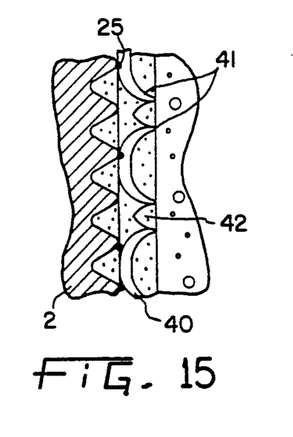
FIG. 15 shows a section of an axial section through the screen sleeve according to FIG. 13 illustrating the welding points and the surface structure of the screen sleeve according to FIG. 13.

FIGS. 13, 14 and 15 serve to illustrate the design of a screen sleeve from perforated steel sheet. FIG. 13 depicts a plurality of steel sheet points 41 which protrude along the shell of the screen sleeve 40, act the same as a grater and surround openings 42. FIG. 14 illustrates a driver strip 21 which is formed by bending over the sheet steel of the screen sleeve 40, which later features an axially extending gap 45, similar to the screen sleeve 30.

Figure 16:
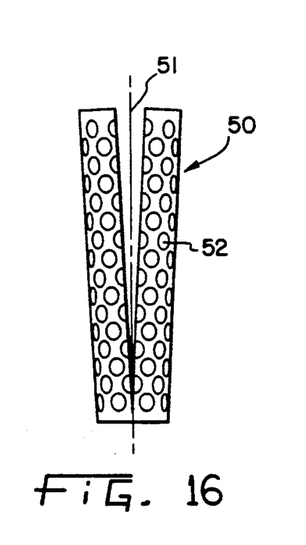
FIG. 16 shows a screen sleeve made of perforated steel sheet.
Figure 17:
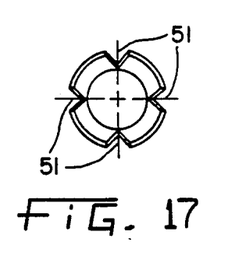
FIG. 17 shows an end view of the screen sleeve according to FIG. 16.
Figure 18:
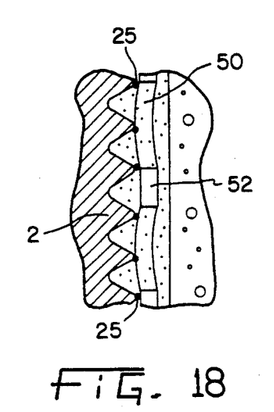
FIG. 18 shows a section of an axial section through the screen sleeve according to FIG. 16 illustrating the welded connection between the threading points of a threaded rod and the inside of the screen sleeve according to FIG. 16.

The screen sleeve 50 illustrated in FIGS. 16, 17 and 18, is made of perforated steel sheet, and is also very effective as a cleaning sleeve, despite its relatively smooth surface. Extending in the axial direction from one end of the screen sleeve 50 up into the vicinity of the opposite end, four slots 51 allow a diameter adaptation of the screen sleeve 50 to conic anchoring rods. FIG. 17 shows a radial plan view of the screen sleeve 50 from the direction of the widened end, while FIG. 18 depicts how the screen sleeve 50 with its smooth-rim holes 52 connects in the area of the lands between the holes 52 with the points of the threading 2, by means of welding points 25.

Figure 19:
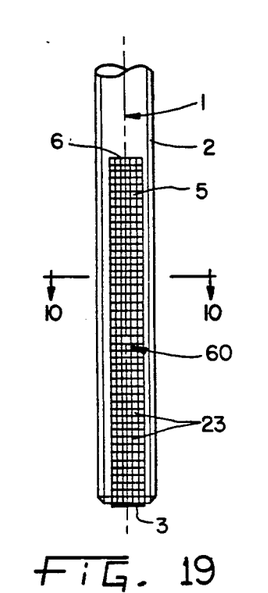
FIG. 19 shows a threaded rod with a strip-shaped wire mesh cover extending along the shell of the threaded rod in axial direction, in flute fashion, up to its front end on two radially opposed shell sides.

Instead of the sleeves described above it is also possible to use a perforated metal strip rather than a perforated sleeve together with an anchoring rod 10, or especially with a threaded rod 1. FIG. 19 shows a threaded rod 1 along the anchoring part of which there extends a wire mesh strip 60. The latter is adapted in its shape to the shape of the shell of the threaded rod 1, which is depicted clearly in FIG. 20. Due to the curvature of the shell of the threaded rod 1, the wire mesh strip 60 serving to cover the shell of the anchoring part of the threaded rod 1 is trough shaped.

As follows from FIG. 20, the wire mesh strip 60 extends in circumferential direction approximately across 90 degrees, and not across 360 degrees as would be the case with a continuous screen sleeve.

Figure 20:
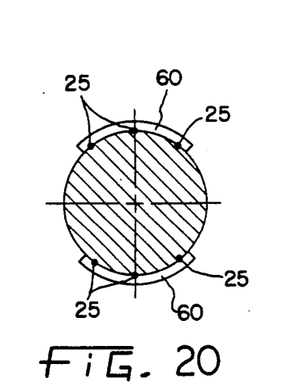
FIG. 20 shows a section along line XX—XX in FIG. 19 illustrating the symmetric covering by the wire mesh strips of a threaded rod.

The wire mesh strip 60 extends up to the front end 3 of the threaded rod 1, where it is bent over, so that the wire mesh strip 60 covers two radially opposed areas of the shell of the threaded rod 1 in the manner deriving from FIG. 20. The wider the strips 60 shown in FIG. 20, the more the cover approaches the shape of a continuous screen sleeve.

The wire mesh strip 60 consists of wires 5 extending in the axial direction and wires 6 extending in circumferential direction. Welding points 25 ensure a safe, rotationally fixed fastening of the wire mesh strip 60 on the threading points of the threaded rod 1.

Figure 21:
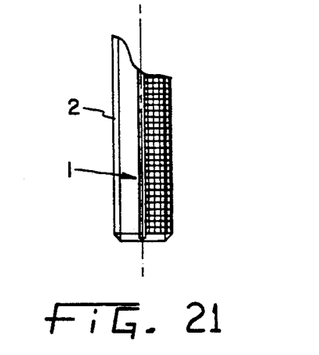
FIG. 21 shows the front end of a threaded rod with two opposed, axially extending grooves and a wire mesh strip each which along its edge pointing in the direction of rotation is angled over and clamped or slipped into the groove.
Figure 22:
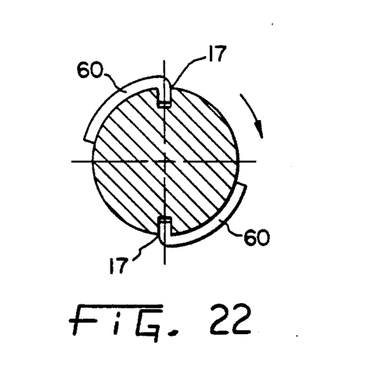
FIG. 22 shows a cross section of the anchoring part of the composite anchor according to FIG. 21.

Rather than choosing an integral design for the wire mesh strip 60 and welding it to the threaded rod 1 in the way shown in FIGS. 19 and 20, it is also possible to use two wire mesh strips 60 and to provide diametrically opposed longitudinal grooves 17 in the shell of the threaded rod 1 as shown in FIGS. 21 and 22. The grooves 17 serve to receive the rim of the wire mesh strip 60 that is bent over in the direction of rotation. The selection of the proper gap width of the groove makes it possible to slip the wire mesh strip 60 into the grooves 17, where it can be clamped in place for a rotationally fixed fastening.

Figure 23:
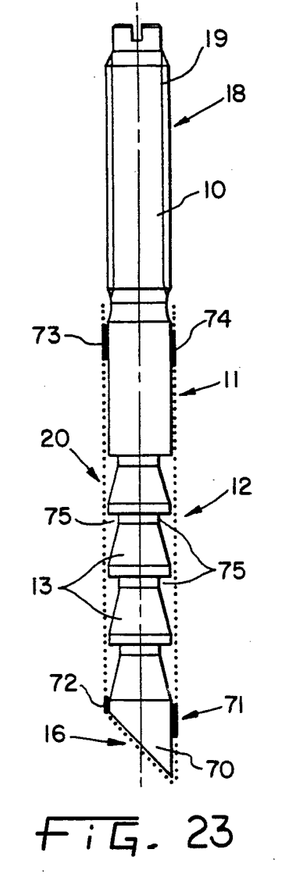
FIG. 23 shows a side elevation of a preferred embodiment of a composite anchor with a wire mesh sleeve illustrated in cross section.

A preferred embodiment of a composite anchor is illustrated in FIG. 23. The composite anchor shown there features an anchor rod 10 with a threaded section 18 featuring a threading 19, with a smooth fastening section 11 and a cone section 12. The latter comprises several cones 13 but differs from the cone section 12 of the embodiment illustrated in FIG. 5 in that a groove 17 has been dispensed with and a roofed cutting edge 70 is provided on the front end 16.

Similar to the embodiment described with the aid of FIGS. 5 through 8, the composite anchor illustrated in FIG. 23 possesses a screen sleeve 20 that extends along the shell surface of the anchor rod 10 and is connected with it at four welding points 71 through 74.

The welding points 71 through 74 are sufficiently stable to assure a rotationally fixed connection between the screen sleeve 20 and the anchor rod 10. In this context, the formfit, which in the area of the front end 16 is obtained by a form varying from a rotational symmetry, has a contributing effect. As can been seen from FIG. 23, the last cone 13 of the anchoring rod 10 extends with an elongated transition zone into the roofed cutting edge 70, which may have an angle of 30 to 60 degrees. The screen sleeve 20 being adapted to the shell surface in the manner illustrated in FIG. 23 and to the bevel of the roofed cutting edge. Thus a formfit is obtained at the front end 16 of the anchoring rod 10, by which part of the torsional forces are absorbed, which occur as the anchoring rod 10 is driven in with the screen sleeve 20 attached to its shell surface. Also visible in FIG. 23 are a plurality of annular spaces 75 that are formed between the conic surfaces of the expanding cone 13 and the cylindrical inside of the screen sleeve 20. These annular spaces 75 allow receiving of the material scraped off the borehole wall as well as the mortar compound.

In a manner comparable with FIG. 8, the composite anchor illustrated in FIG. 23 permits an afterexpansion of a cured mortar compound as a crack occurs, since the welding points 71 through 74 are designed as rated break points which, while sufficiently strong to absorb the torsional forces occurring in circumferential direction in the insertion process are sufficiently weak to release the anchoring rod 10 upon occurrence of a traction force.

Figure 24:
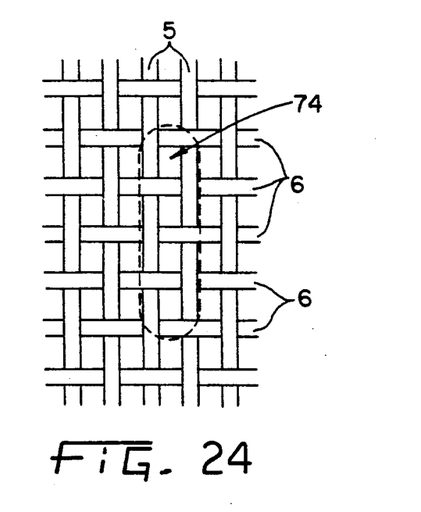
FIG. 24 shows a plan view of a welding point of the wire mesh sleeve for a composite anchor according to FIG. 23.

In FIG. 24, the welding point 74 is illustrated enlarged and representatively. The welding point 74 connects two axial wires 5 and five surrounding wires 6 with the smooth fastening section 11. Due to varying from the quadratic shape, the welding point 74 has in circumferential direction a greater load-bearing capacity than it has in axial direction. A load acting in axial direction causes a force transfer by merely two axial wires 5 which, however, in the case of a crack forming in the cured mortar shell, can break relatively easily in response to traction forces acting on the anchoring rod 10. The axial wires 5 of the welding points 71 through 73 rupture correspondingly, thus allowing an afterexpansion of the cured mortar shell.

Owing to the asymmetric shape on the front end 16 of the anchoring rod 10 with the screen sleeve 20 adapted to the shape of the roofed cutting edge 70, a rotationally fixed connection is obtained between the screen sleeve 20 and thus the mortar shell, on the one hand, and the anchoring rod 10 on the other. This connection is effective also when the welding points 71 through 74, through rupturing of the axial wires 5, allow an axial movement for afterexpansion of the mortar shell. Thus, after setting, it is also possible in the cured condition of the mortar to exert a torque on the threaded section 18. It need not be mentioned that the axial wires 5 and the surrounding wires 6 are merely connected by friction forces at their intersections, and not welded to one another.

Figure 25:
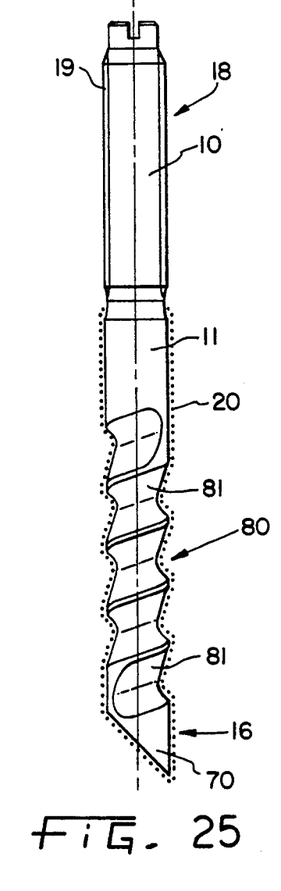
FIG. 25 shows another embodiment for a composite anchor with a wire mesh sleeve which by formfit is fastened rotationally fixed.

FIG. 25 shows another design of an anchoring rod 10 with a threaded section 18 and a threading 19. The smooth fastening section 11 of this anchoring rod extends into a spiral section 80 that is formed by a spiral recess 81. The screen sleeve 20 envelops the smooth fastening section 11 and the spiral section 80 in the way illustrated in FIG. 25, allowing due to the formfit a rotationally fixed connection. The torsional strength is increased in that on the front end 16, as in the embodiment shown in FIG. 23, a roofed cutting edge 70 is provided with which the coordinated shell area of the screen sleeve 20 is also in intimate contact.

Figure 26:
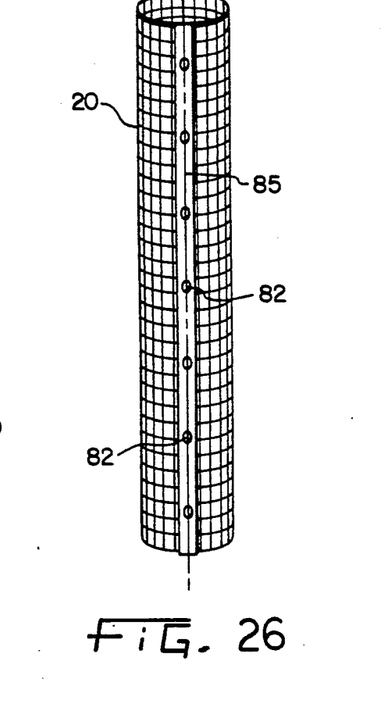
FIG. 26 shows a wire mesh sleeve with a steel sheet strip for reinforcement, in side elevation.

To achieve a better stability to twisting, of the screen sleeve 20, the latter may be provided, in the fashion illustrated in FIG. 26, with a thin sheet metal strip 85 which is spot welded to the screen sleeve at points 82.

Figure 27:
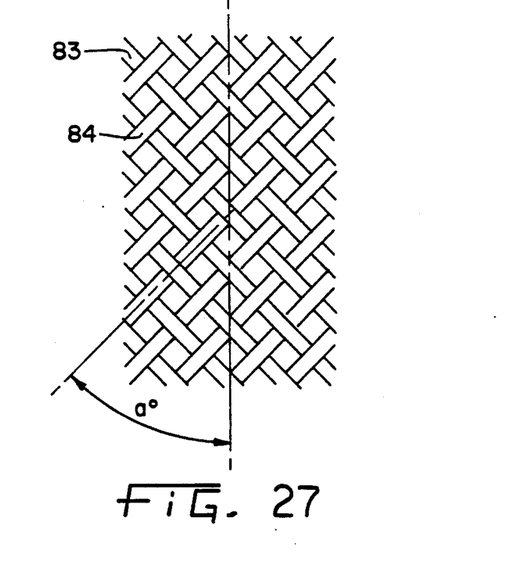
FIG. 27 shows an enlarged illustration of how the wires of a wire mesh sleeve extend, with slanted mesh wires.

Another possibility of increasing the stability of the screen sleeve 20 consists in arranging the wires 83, 84 of the screen sleeve 20, as illustrated in FIG. 27, at an angle of 30 to 60 degrees relative to the longitudinal axis of the sleeve.

The characteristics explained with the aid of FIGS. 23 through 27 enable the shipment of a complete fastener which at installation prevents an improper setting, i.e., setting the anchoring rod 10 without a screen sleeve 20.

While the present invention has been particularly described in the context of a preferred embodiment, it will be understood that the invention is not limited thereby. Therefore, it is intended that the scope of the invention include any variations, uses or adaptations of the invention following the general principles thereof and including such departures from the disclosed embodiment as come within known or customary practice in the art to which the invention pertains and which fall within the appended claims or the equivalents thereof.

What is claimed is:

1. A composite anchor adapted to be rotatably inserted in a borehole which may be filled with a curable mortar compound, said anchor comprising an elongated anchoring member having an elongated outer surface, a substantially rigid cover rotationally fixedly connected to said surface for rotation with said anchoring member, said cover extending in the longitudinal direction of said anchoring member across a circumferential section of said outer surface and defining a plurality of spaces between said outer surface and said cover, said cover including means for sweeping the borehole wall of a said borehole upon insertion of the anchor in a said borehole, said cover including a plurality of radial openings adapted to permit said mortar material removed from said borehole wall to enter said spaces.

2. Composite anchor according to claim 1, wherein said cover is a wire mesh strip.

3. Composite anchor according to claim 2, wherein said wire mesh strip extends axially along said surface to the front end of said anchoring member.

4. Composite anchor according to claim 2, wherein said wire mesh strip is bent over said front end of said anchoring member and extends along radially opposed surface areas thereof.

5. Composite anchor according to claim 1, wherein said cover is welded to said anchoring member at a plurality of points.

6. Composite anchor according to claim 1, wherein said cover includes a radially inwardly bent portion which is inserted into an axial groove in said anchoring member.

7. Composite anchor according to claim 1, wherein said cover comprises a sleeve which completely surrounds said anchoring member, said anchoring member comprising a threaded rod said sleeve welded to the threads of said threaded rod.

8. Composite anchor according to claim 1, wherein said cover comprises a sleeve which completely surrounds said anchoring member, said anchoring member including an axial groove, said sleeve including a driver strip which engages said radial groove.

9. Composite anchor according to claim 7, wherein said sleeve comprises a wire mesh sleeve including axially extending wires and circumferentially extending wires.

10. Composite anchor according to claim 1, wherein said cover is made of honeycomb steel sheet.

11. Composite anchor according to claim 1, wherein said cover is made of perforated steel sheet.

12. Composite anchor according to claim 11 wherein said openings are surrounded by radially outwardly extending points.

13. Composite anchor according to claim 1, wherein said anchoring member comprises an anchoring rod including a tapered cone.

14. Composite anchor according to claim 1, wherein the front end of said anchoring member forms a cutting edge.

15. Composite anchor according to claim 13, wherein said cover is connected to the front and rear ends of said anchoring rod by means of break points which rupture as traction is applied to the anchoring rod.

16. Composite anchor according to claim 15, wherein said cover comprises a wire mesh sleeve which is welded to said anchoring rod in such a way that the weld covers fewer of said axially extending wires then said circumferentially extending wires.

17. Composite anchor according to claim 16, wherein on the front end and the rear end of said wire mesh sleeve, at each two diametrically opposed points thereof, two axially extending wires and five circumferentially extending wires of said sleeve are welded to said rod.

18. Composite anchor according to claim 1, wherein said anchoring member comprises a spiraled rod, the front end of said rod including a peaked cutting edge, said cover comprising a wire mesh sleeve which surrounds said cutting edge and is held rotationally fixed by formfit.

19. Composite anchor according to claim 1, wherein said cover comprises a wire mesh sleeve which is stabilized by a thin metallic sheet strip, said strip extending in the axial direction of said member, and said strip welded to said wire mesh sleeve at a plurality of points.

20. Composite anchor according to claim 1, wherein said cover comprises a wire mesh sleeve whose wires extend generally perpendicularly to one another and are arranged, relative to the longitudinal axis of the sleeve, at an angle between 30 and 60 degrees.

* * * * *